(12) United States Patent
Srinivasalu

(10) Patent No.: US 11,661,212 B2
(45) Date of Patent: May 30, 2023

(54) PROGNOSTIC AND HEALTH MONITORING BY ENERGY METERING AT POWER SUPPLY INTERFACE

(71) Applicant: Hamilton Sundstrand Corporation, Charlotte, NC (US)

(72) Inventor: Vivek Srinivasalu, Karnataka (IN)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 301 days.

(21) Appl. No.: 17/023,728

(22) Filed: Sep. 17, 2020

(65) Prior Publication Data

US 2021/0316883 A1 Oct. 14, 2021

(30) Foreign Application Priority Data

Apr. 11, 2020 (IN) .............................. 202011015787

(51) Int. Cl.
*B64F 5/60* (2017.01)
*B64D 45/00* (2006.01)

(52) U.S. Cl.
CPC ................ *B64F 5/60* (2017.01); *B64D 45/00* (2013.01); *B64D 2045/0085* (2013.01)

(58) Field of Classification Search
CPC ... B64F 5/60; B64D 45/00; B64D 2045/0085; G05B 23/0235; G05B 23/027; G05B 23/0221
See application file for complete search history.

(56) References Cited

U.S. PATENT DOCUMENTS

| 4,896,101 | A | 1/1990 | Cobb |
| 6,642,721 | B2 | 11/2003 | Tsuchiya |
| 6,947,797 | B2 * | 9/2005 | Dean .................. G05B 23/0281 702/182 |
| 7,509,537 | B1 | 3/2009 | Jensen et al. |
| 7,742,885 | B2 | 6/2010 | Oohasi et al. |
| 9,568,517 | B2 | 2/2017 | Lim et al. |

(Continued)

FOREIGN PATENT DOCUMENTS

| EP | 2378256 A2 | 10/2011 |
| EP | 3217243 A1 | 9/2017 |

OTHER PUBLICATIONS

Extended European Search Report dated Aug. 11, 2021 for Application No. 21164476.0.

*Primary Examiner* — Mussa A Shaawat
(74) *Attorney, Agent, or Firm* — Cantor Colburn LLP

(57) ABSTRACT

Provided is an embodiment for a method for performing prognostics and health monitoring. The method includes detecting operational usage data for a line replaceable unit (LRU), and aggregating the operational usage data with previous operational usage data during a period of time. The method also includes determining a total value for the aggregated operational usage data for the period of time, and generating a histogram to track the operational usage data, wherein the histogram comprises a plurality of buckets, each bucket corresponding to a range of values for the operational usage data. The method includes responsive to expiration of the period of time, adding a count to a bucket of the plurality of buckets corresponding to the total value for the aggregated operational data for the period of time. Also provided is an embodiment for a system for performing prognostics and health monitoring.

6 Claims, 4 Drawing Sheets

(56) References Cited

U.S. PATENT DOCUMENTS

| | | | |
|---|---|---|---|
| 10,151,803 B2 | 12/2018 | Rutheiser | |
| 10,725,463 B1* | 7/2020 | Dixit | G06F 17/15 |
| 2003/0114966 A1* | 6/2003 | Ferguson | G06F 11/2294 |
| | | | 701/31.4 |
| 2004/0039502 A1* | 2/2004 | Wilson | G01D 21/02 |
| | | | 701/32.7 |
| 2004/0135034 A1* | 7/2004 | Abel | B64G 1/426 |
| | | | 244/165 |
| 2006/0126608 A1* | 6/2006 | Pereira | H04L 41/0853 |
| | | | 370/360 |
| 2006/0230313 A1* | 10/2006 | Grichnik | G05B 23/0254 |
| | | | 714/26 |
| 2009/0185723 A1* | 7/2009 | Kurtz | G06V 40/50 |
| | | | 382/118 |
| 2016/0362197 A1* | 12/2016 | Chippar | B64F 5/60 |
| 2019/0123985 A1* | 4/2019 | Rao | H04L 43/062 |
| 2019/0323407 A1 | 10/2019 | Kinsella | |
| 2019/0324075 A1 | 10/2019 | Kinsella | |
| 2021/0024224 A1* | 1/2021 | Mohan | G07C 5/0808 |

* cited by examiner

PROGNOSTIC AND HEALTH MONITORING BY ENERGY METERING AT POWER SUPPLY INTERFACE

CROSS-REFERENCE TO RELATED APPLICATIONS

This application claims the benefit of Indian Patent Application No. 202011015787 filed Apr. 11, 2020, which is incorporated herein by reference in its entirety.

BACKGROUND

The present invention relates to health monitoring systems, and more specifically, to prognostic and health monitoring by energy metering at a power supply interface.

Line replaceable units (LRU) experience wear and tear over time and require maintenance and/or replacement. LRUs are modular components that are designed to be quickly replaced such as for an aircraft, ship, or spacecraft. LRUs can include a Circuit Card Assembly that is used to control various circuits. There may be a need to efficiently track the operational usage of the LRU to perform repair or replacement based on the actual power consumed by the LRU instead of a time-based schedule.

BRIEF DESCRIPTION

Disclosed is a method for performing prognostic and health monitoring in accordance with one or more embodiment of the disclosure. The method includes detecting operational usage data for a line replaceable unit (LRU); aggregating the operational usage data with previous operational usage data during a period of time; determining a total value for the aggregated operational usage data for the period of time; generating a histogram to track the operational usage data, wherein the histogram comprises a plurality of buckets, each bucket corresponding to a range of values for the operational usage data; and responsive to expiration of the period of time, adding a count to a bucket of the plurality of buckets corresponding to the total value for the aggregated operational data for the period of time.

In addition to one or more of the features described herein, or as an alternative, further embodiments include responsive to the expiry of each period of time, resetting the total value for the aggregated operational usage data for a subsequent period of time.

In addition to one or more of the features described herein, or as an alternative, further embodiments include operational usage data that includes voltage and current readings obtained from a current sensor coupled to the LRU.

In addition to one or more of the features described herein, or as an alternative, further embodiments include storing a time stamp for each period of time and corresponding aggregated operational usage data for each period of time.

In addition to one or more of the features described herein, or as an alternative, further embodiments include tracking a total energy value for the histogram over multiple periods of time; comparing the total energy value of the histogram to a histogram energy threshold; responsive to the total energy value of the histogram exceeding the histogram energy threshold value, generating a subsequent histogram to continue tracking the operational usage data of the LRU; otherwise, continue monitoring the operational usage data of the LRU current histogram.

In addition to one or more of the features described herein, or as an alternative, further embodiments include storing a series of histograms for the LRU.

In addition to one or more of the features described herein, or as an alternative, further embodiments include comparing a corresponding bucket count in each corresponding histogram in the series of histograms to determine an abnormal condition.

In addition to one or more of the features described herein, or as an alternative, further embodiments include generating an alarm based on comparing the corresponding bucket count in each corresponding histogram.

Also disclosed is a system for performing prognostic and health monitoring in accordance with one or more embodiment of the disclosure. The system includes a power supply voltage rail configured to supply power to a line replaceable unit; a current sensor coupled to the power supply voltage rail and the line replaceable unit, the current sensor configured to detect a parameter; and a processor. The processor is configured to: detect operational usage data for a line replaceable unit (LRU); aggregate the operational usage data with previous operational usage data during a period of time; determine a total value for the aggregated operational usage data for the period of time; generate a histogram to track the operational usage data, wherein the histogram comprises a plurality of buckets, each bucket corresponding to a range of values for the operational usage data; and responsive to expiration of the period of time, add a count to a bucket of the plurality of buckets corresponding to the total value for the aggregated operational data for the period of time.

In addition to one or more of the features described herein, or as an alternative, further embodiments include a processor that is configured to responsive to the expiry of each period of time, reset the total value for the aggregated operational usage data for a subsequent period of time.

In addition to one or more of the features described herein, or as an alternative, further embodiments include operational usage data that includes voltage and current readings obtained from a current sensor coupled to the LRU.

In addition to one or more of the features described herein, or as an alternative, further embodiments include a processor that is configured to store a time stamp for each period of time and corresponding aggregated operational usage data for each period of time.

In addition to one or more of the features described herein, or as an alternative, further embodiments include a processor that is configured to track a total energy value for the histogram over multiple periods of time; compare total energy value of the histogram to a histogram energy threshold; responsive to the total energy value of the histogram exceeding the histogram energy threshold value, generate a subsequent histogram to continue tracking the operational usage data of the LRU; otherwise, continue to monitor the operational usage data of the LRU current histogram.

In addition to one or more of the features described herein, or as an alternative, further embodiments include a processor that is configured to store a series of histograms for the LRU.

In addition to one or more of the features described herein, or as an alternative, further embodiments include a processor that is configured to compare a corresponding bucket count in each corresponding histogram in the series of histograms to determine an abnormal condition.

In addition to one or more of the features described herein, or as an alternative, further embodiments include a processor that is configured to generate an alarm based on comparing the corresponding bucket count in each corresponding histogram.

Technical effects of embodiments of the present disclosure include improving the prognostics and health monitoring of a unit by monitoring the amount of energy that is consumed during operation over the life of the unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

In today's environment, there are no robust strategies to monitor the health of a line replacement unit (LRU) embedded within the LRU. The LRU can include a circuit card assembly, power supply card, or another type of equipment. The duration of time which the LRU is in use may not be known. For example, if an LRU was used for a period of time, removed, and then re-installed the use between the first installation and the second installation may not be known. In addition, the time in which the LRU is stored and waiting to be installed may be unknown.

The techniques described herein provide for prognostics and health monitoring based on the actual operational usage of the LRU and not based on time. Instead of collecting and monitoring the operational data over a period of time (such as hours, days, weeks, etc.), the amount of energy that is metered or consumed by the LUR is measured (such as a 100, 500, 1000 joules, etc.) and used to track any abnormal operation over the life of the LRU. The techniques described herein improve the data strategy for performing health monitoring and prognostics of the LRU. Fault conditions may be detected based on the analysis of the data.

Figure 1:
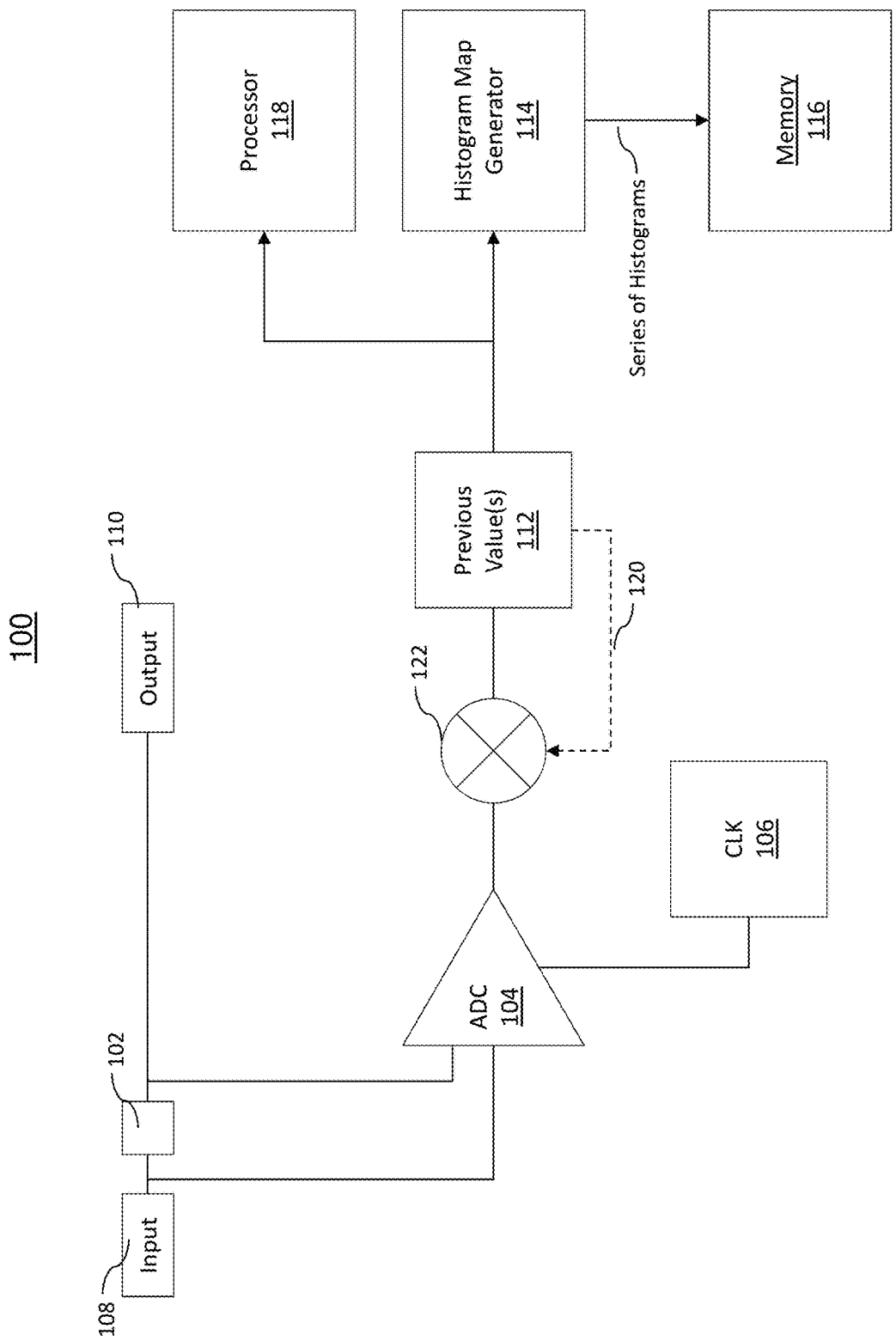
FIG. 1 depicts a system for performing prognostics and health monitoring in accordance with one or more embodiments of the disclosure.

FIG. 1 depicts a block diagram of a system 100 for performing health monitoring and prognostics in accordance with one or more embodiments. FIG. 1 illustrates a high-level architecture of the system 100. The system 100 is configured as a metering block that is configured to receive an input power supply voltage rail. The system 100 includes a current sensor 102, an analog-to-digital converter (ADC) 104, and a clock generating circuit 106. The system 100 also includes a histogram map generator module 114, a memory 116, and a processor 118. It should be understood that a different arrangement of components can be implemented in the system 100.

The current sensor 102 is configured to detect the current and provide an input to the ADC 104. It should be understood that any type of current sensor 102 can be used in the system 100. The value of the resistance of the current sensor 102 is known and the value of the resistance can be used to calculate the power and energy used by the LRU.

The ADC 104 is coupled to a current sensor 102 and periodically detects the current using the current sensor 102. The ADC 104 is configured to convert the signal received from the current sensor 102. The data is collected over a period(s) of time to track the actual usage or operational usage of the LRU. The current, voltage, and resistance values of the current sensor 102 can be used to determine the power or energy that is supplied to the LRU. In particular, the input voltage is multiplied by the input current to calculate the power. The calculated power can be aggregated over a period of time and represents the energy that is consumed by the system 100.

A clock signal is generated by the clock generating circuit 106. The clock generating circuit 106 can be any known or developed clock generation circuit. The clock generation circuit 106 can be designed to provide a pulse or clock signal at the desired interval to trigger the reading of the current by the ADC 104. For example, the clock signal can be generated by the clock generation circuit 106 every 0.5, 1 second, etc.

In this non-limiting example, at each minute the amount of power can be calculated using the reading from the ADC 104. A power calculation to determine a current power value. The instant power value can be added to the previous power value(s) 112 until expiration of a period of time, as shown by the dashed line 120 and the operator 122. This enables the system 100 to maintain a total for the amount of power consumed. This process is repeated over the life of the LRU so that the LRU health can be monitored. In one or more embodiments of the disclosure, the aggregated power value for each period of time can be stored in a memory 116. Also, a time stamp such as the minute count can be stored in the memory 116.

The histogram map generator module 114 can generate histogram(s) over the life cycle of the LRU and arranges each histogram for a quanta of energy. The plurality of histograms generated by the histogram map generator module 114 can be stored in the memory 116. In one or more embodiments of the disclosure, the memory 116 can include a non-volatile memory. The non-volatile memory enables the previously stored series of histograms to be available for future analysis in the event that power is removed from the system 100. Each histogram includes a plurality of buckets as discussed and shown with reference to FIG. 2. Each bucket represents a range of energy that has been sensed by the current sensor for each period of time and a count is added to the corresponding buckets after each period of time.

Each histogram represents a quantity of energy that is equal to an energy threshold. After an amount of energy has been recorded in the histogram equal to the threshold energy, another histogram is generated, and a series of histograms stored in the memory 116 can be used for analysis. By arranging the histograms in such a manner, each histogram in the series of histograms can be compared to each other over a period of time. The operational usage data over several histograms should not substantially vary and should be generally consistent with other histograms given the performance of the LRU. Any substantial deviations from the other histograms, such as deviations from the average performance, can indicate an abnormal operation or degrading performance of the LRU.

In one or more embodiments of the disclosure, the histograms stored in the memory 116 can be displayed to a user. It should also be understood the operational usage data can be displayed to the user in a numerical or graphical format.

Figure 2:
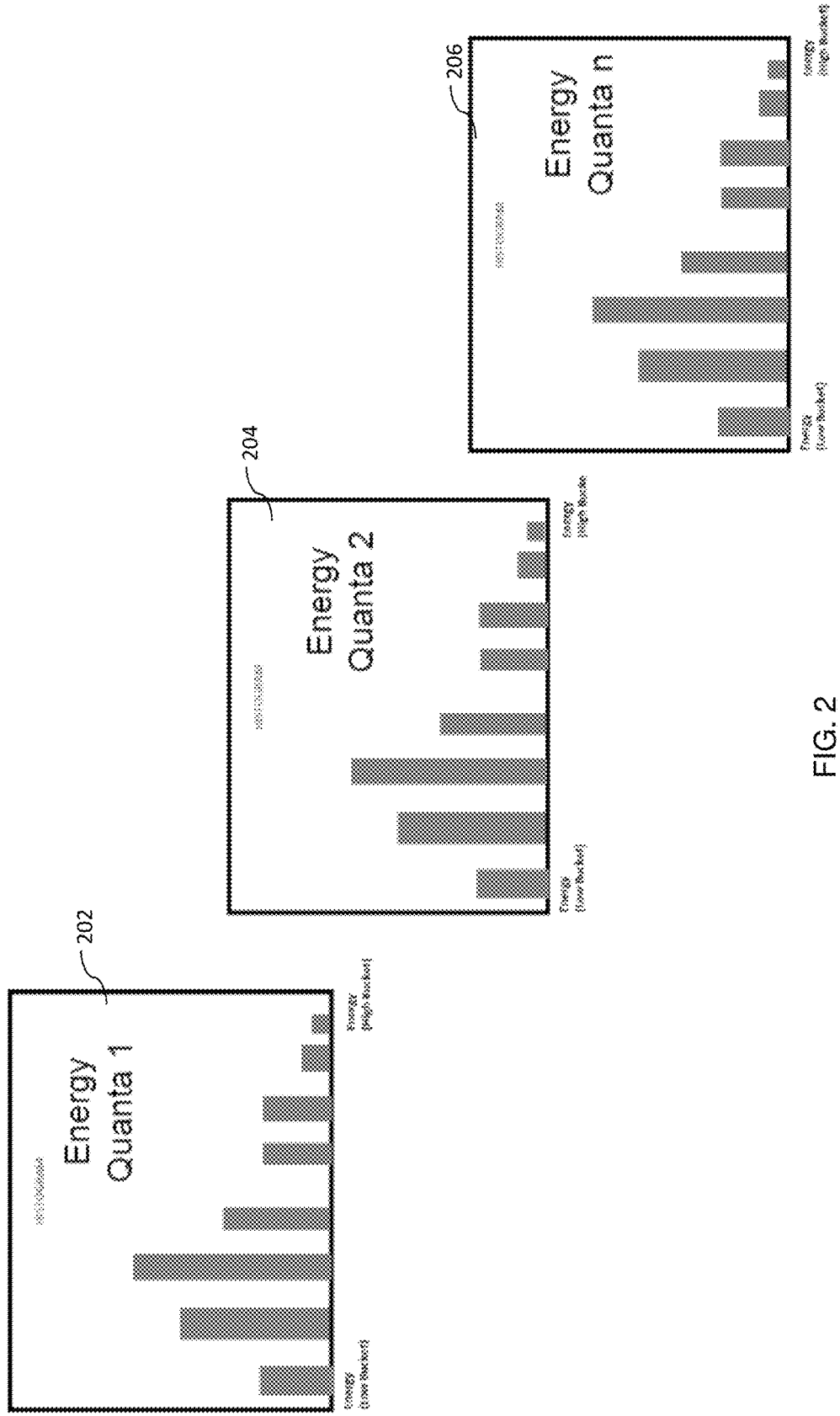
FIG. 2 depicts an example of a series of histograms in accordance with one or more embodiments of the disclosure.

FIG. 2 depicts a series of histograms in accordance with one or more embodiments of the disclosure. In one or more embodiments of the disclosure, a histogram map generator module 114 generates a histogram to enable efficient tracking of the energy utilization of the LRU. In a non-limiting example, three (3) histograms 202, 204, 206 are shown. Each individual histogram represents a quanta of energy. A quantum is a discrete quantity of energy that is proportional in magnitude to the frequency of radiation it represents.

Each bar in the direction of the x-axis of the histogram represents a bucket. In the non-limiting example, each histogram includes eight buckets. A first bucket can represent values for the operational usage data in the range of 1-5 joule, the second bucket can represent a range of 6-10 joules, and so on, and so forth. It should be understood that the range of values for each bucket can be refined based upon its application and is not limited to the 5 joules increments as shown in FIG. 2. A count (represented in the direction of the Y-axis) is added to the corresponding bucket based on the detection by the system 100 for each period of time.

The count associated with the low energy buckets and the high energy buckets can indicate abnormal power usage. The trend can be determined over many histograms to determine whether a deviation from the trend is abnormal. Histograms will not change dramatically from one histogram to the next. If there is a significant shift, this will be readily identifiable. For example, it is expected that for a single LRU or the same type of LRU, the count for each bucket in the histogram to be similar for a quant of energy. For example, the count for the low energy buckets for the first histogram can be similar to a third histogram or n histogram. Similar counts are to be expected for the normal energy buckets as well as the high energy buckets from histogram to histogram.

Over time an average number of counts can be expected and used to identify any abnormal performance. The deviations of the number of counts can be configured. For example, a tolerance can be set for each bucket such as having a count that is within 5 counts of the other histograms or the average of the other histograms. It should be understood that any value can be used. Although three (3) histograms 202, 204, 206 are shown, it is not intended to be limiting and only provides a non-limiting example. It should be understood that any number of histograms can be used.

Figure 3:
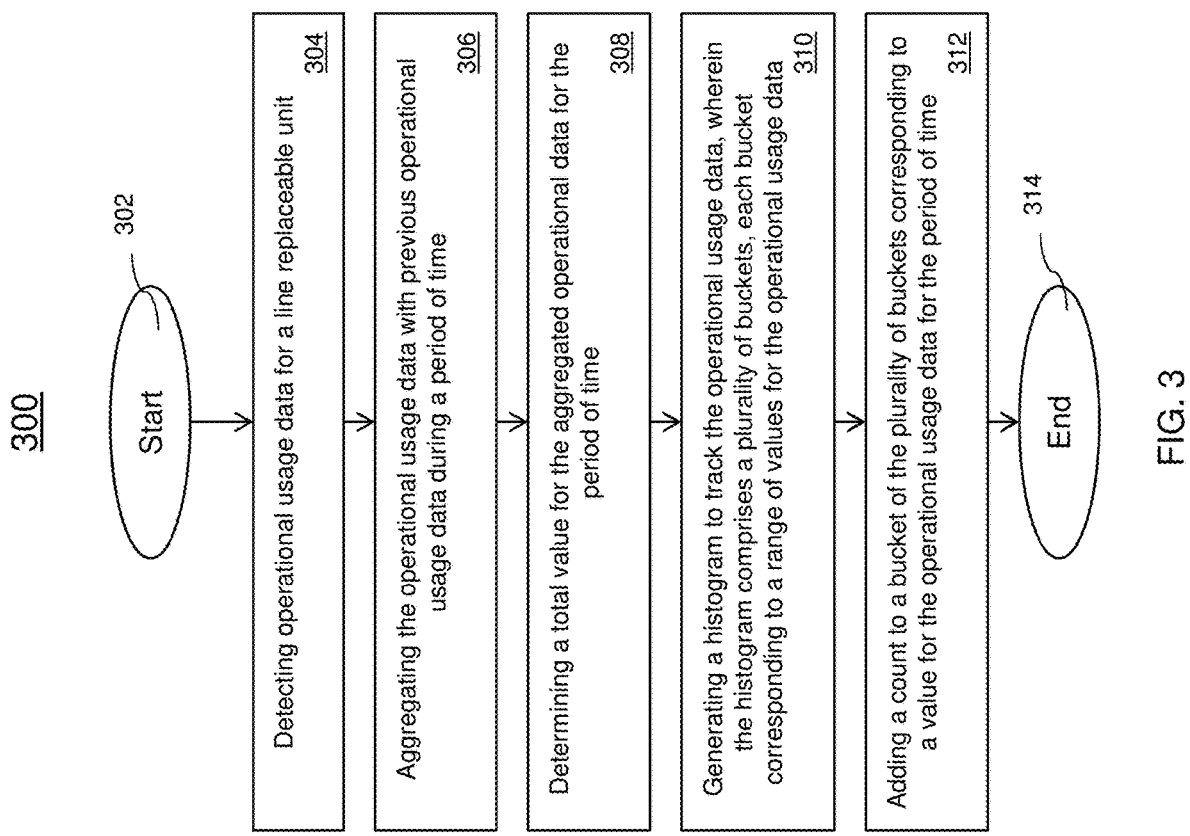
FIG. 3 depicts a flowchart of a method for performing prognostics and health monitoring in accordance with one or more embodiments of the disclosure.

The operation of the system 100 is now described in greater detail. FIG. 3 depicts a flowchart of a method 300 for performing prognostics and health monitoring in accordance with one or more embodiments of the disclosure.

FIG. 3 depicts a flowchart of a method 300 for performing prognostics and health monitoring for an LRU. The method 300 begins at block 302 and proceeds to block 304 which provides for detecting operational usage data for a line replaceable unit. In one or more embodiments of the disclosure, the operational usage data includes voltage and current readings obtained using the current sensor that is coupled to the power supply voltage rail for the LRU.

Block 306 aggregates the operational usage data with previous operation usage data over a period of time. The voltage and current readings from the current sensor are periodically obtained and are aggregated over a period of time. In some embodiments, power is calculated using the current reading from the current sensor, the resistance value of the current sensor, and power supply voltage rail information.

Block 308 determines a total value for the aggregated operational usage data for the period of time. The power value for each period calculated. The power value and minute count can be stored.

Block 310 generates a histogram to track the operational usage data, wherein the histogram comprises a plurality of buckets, each bucket corresponding to a range of values for the operational usage data.

Block 312 adds a count to a bucket of the plurality of buckets corresponding to a value for the operational usage data. In one or more embodiments of the disclosure, the total energy over multiple periods of time is tracked and compared to an energy threshold value and responsive to exceeding the energy threshold, a subsequent histogram is generated. Each subsequent histogram is generated upon exceeding the energy threshold. That is, each histogram stores operational data representing a quanta of energy and the amount of time (number of periods of time) is not relevant when generating the next histogram. This enables accurate tracking of the operational usage of the LRU as opposed to simply tracking the amount of time the LRU is in operation.

The method 300 ends at block 314. It should be understood that additional steps or a different sequence of steps can be implemented in the method 300 and is not intended to be limited by the steps shown in FIG. 3.

Figure 4:
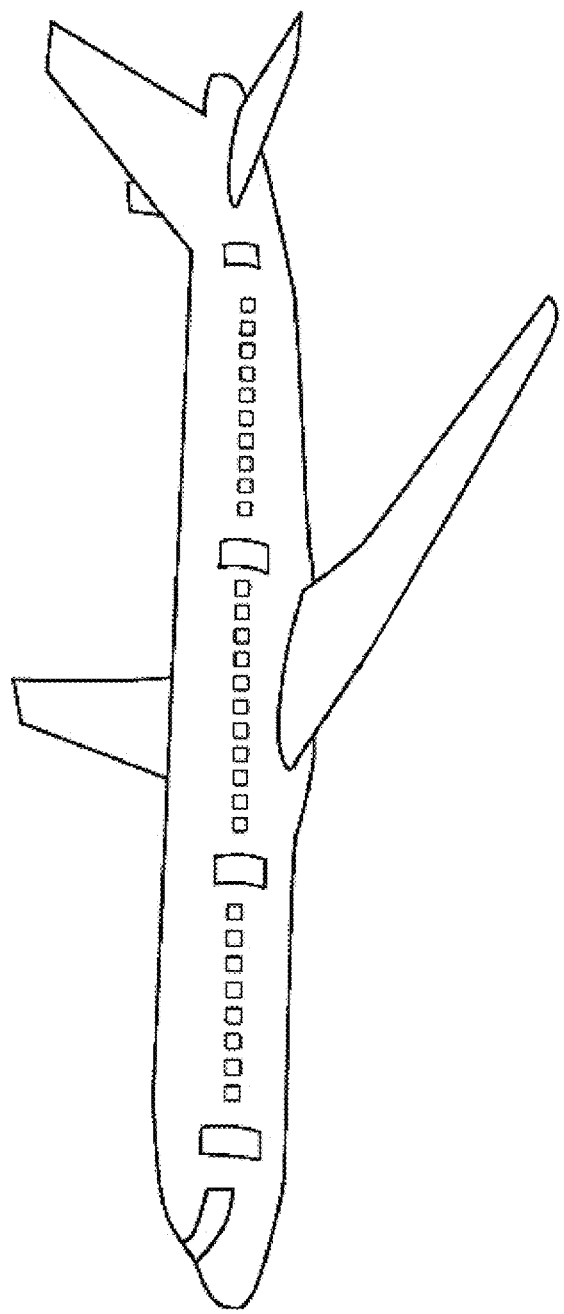
FIG. 4 depicts an aircraft that can implement the system in accordance with one or more embodiments of the disclosure.

FIG. 4 depicts an aircraft 400 upon which the system 100 for performing prognostics and health monitoring of an LRU may be performed. The technical effects and benefits include performing prognostics and health monitoring for an LRU by tracking the operational data and power supplied to the device over its lifetime. The operational data used arranged in a series of histograms that allow for the intuitive analysis of the LRU's operation from one chart to the next.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for performing prognostics and health monitoring, the method comprises:
    detecting power usage data for a line replaceable unit (LRU);
    aggregating the power usage date of the LRU data with previous power usage data during a period of time;
    determining a total value for the aggregated power usage data for the period of time;
    generating a histogram to track the power usage data, wherein the histogram comprises a plurality of buckets, each bucket corresponding to a range of values for the power usage data;
    responsive to expiration of the period of time, adding a count to a bucket of the plurality of buckets corresponding to the total value for the aggregated operational data for the period of time; and
    tracking a total energy value for the histogram over multiple periods of time;
    comparing the total energy value of the histogram to a histogram energy threshold; and
    storing a series of histograms for the LRU;
    comparing a corresponding bucket count in each corresponding histogram in the series of histograms to determine an abnormal condition of the LRU; and
    generating an alarm for the LRU based on comparing the corresponding bucket count in each corresponding histogram.

2. The method of claim 1, responsive to the expiry of each period of time, resetting the total value for the aggregated operational usage data for a subsequent period of time.

3. The method of claim 1, wherein the operational usage data comprises voltage and current readings obtained from a current sensor coupled to the LRU.

4. The method of claim 1, further comprising storing a time stamp for each period of time and corresponding aggregated operational usage data for each period of time.

5. The method of claim 1, further comprising
    responsive to the total energy value of the histogram exceeding the histogram energy threshold value, generating a subsequent histogram to continue tracking the data of the LRU;
    otherwise, continue monitoring the operational usage data of the LRU current histogram.

6. A system for performing prognostics and health monitoring, the system comprising:
    a power supply voltage rail configured to supply power to a line replaceable unit (LRU);
    a current sensor coupled to the power supply voltage rail and the LRU, the current sensor configured to detect a power usage parameter; and
    a processor configured to perform the method of claim 1.

* * * * *